Figure 1:
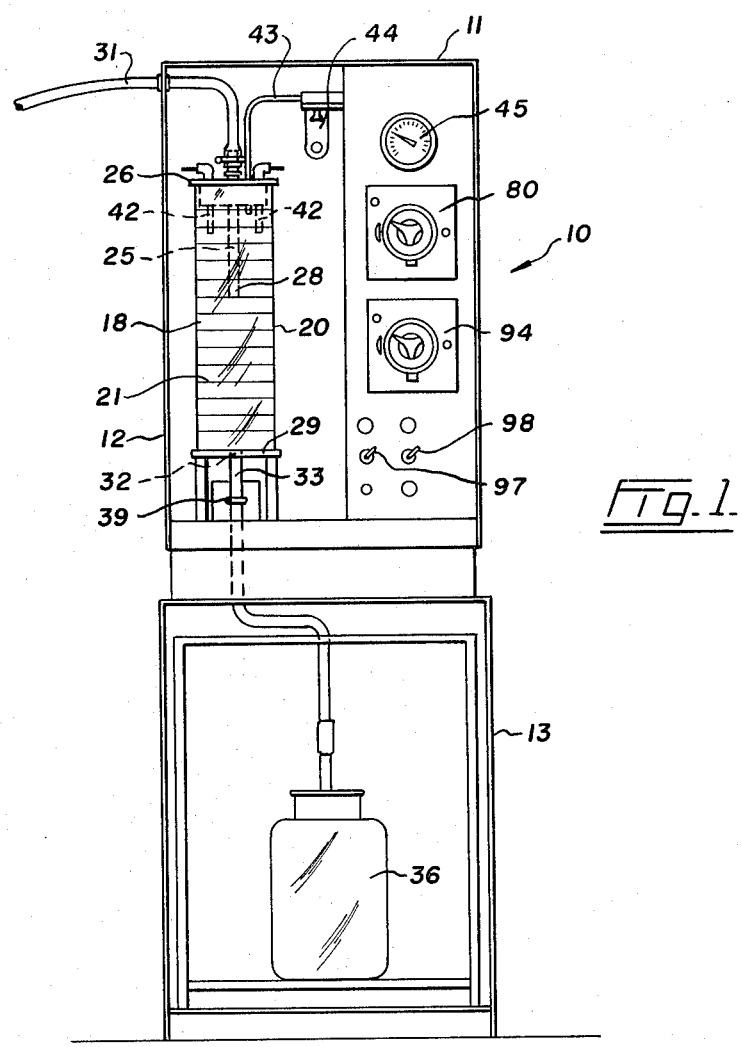

United States Patent [19]

Singer

[11] 3,795,347

[45] Mar. 5, 1974

[54] POWER PURGED LIQUID SAMPLER

[76] Inventor: Ernst Singer, P.O. Box 3491 Luget Dr., Vancouver, British Columbia, Canada

[22] Filed: Feb. 3, 1972

[21] Appl. No.: 223,152

[52] U.S. Cl. ................................. 222/21, 137/392
[51] Int. Cl. .............................................. B67d 5/30
[58] Field of Search ....... 141/4, 5, 7, 59, 37, 39, 47, 141/49, 54, 115, 116, 50; 137/386, 392; 222/17–21, 464

[56] References Cited
UNITED STATES PATENTS

| | | | |
|---|---|---|---|
| 3,313,326 | 4/1967 | Pellerino | 141/50 X |
| 3,404,809 | 10/1968 | Harris et al. | 222/17 |
| 3,407,973 | 10/1968 | Scott | 222/464 X |

*Primary Examiner*—Houston S. Bell, Jr.
*Assistant Examiner*—Charles Gorenstein
*Attorney, Agent, or Firm*—Fetherstonhaugh & Co.

[57] ABSTRACT

Apparatus for taking measured samples of liquids with or without solids therein. This apparatus includes a volume control tube extending into a closed metering chamber and terminating above the bottom of the latter. A vacuum-pressure power source is operatively connected to the chamber, and programmer means causes this source alternately to apply vacuum and pressure to the chamber. A level controller in the chamber above the lower end of the control tube is connected to operate the power source to shut off the vacuum and start the pressure when liquid in the chamber reaches a predetermined level. A valve controlled outlet at the bottom of the chamber allows the liquids to flow out of it after the pressure has forced the level of the liquid to the lower end of the control tube.

19 Claims, 9 Drawing Figures

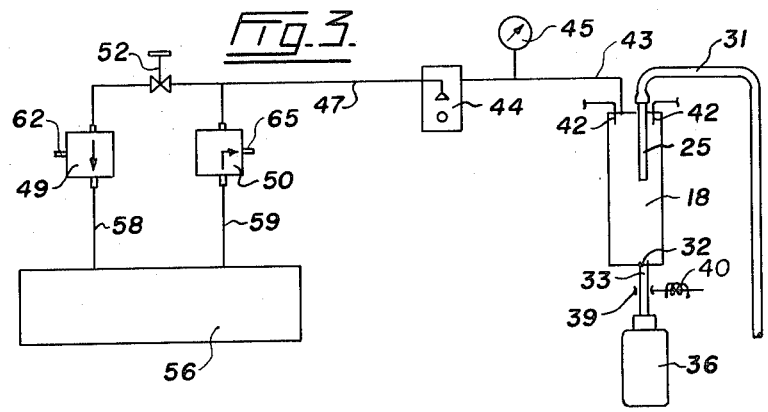
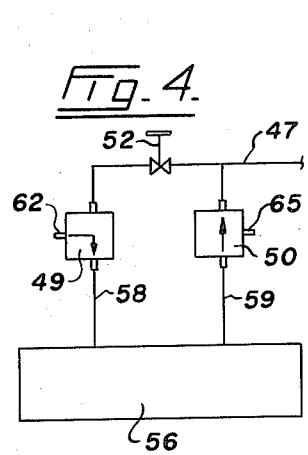
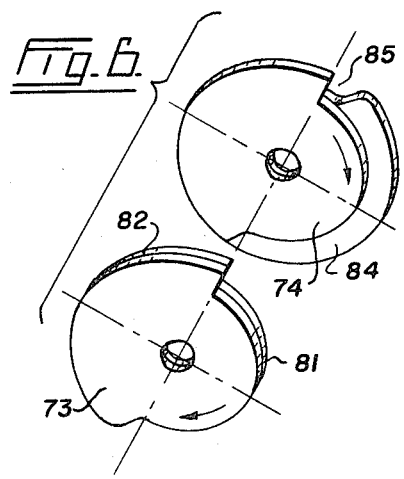
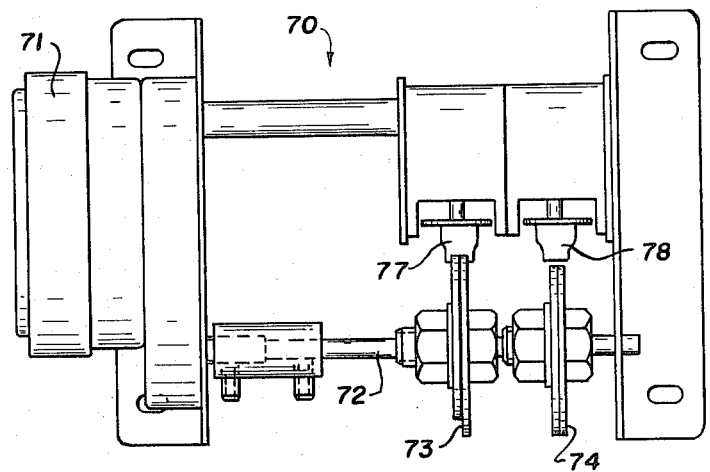

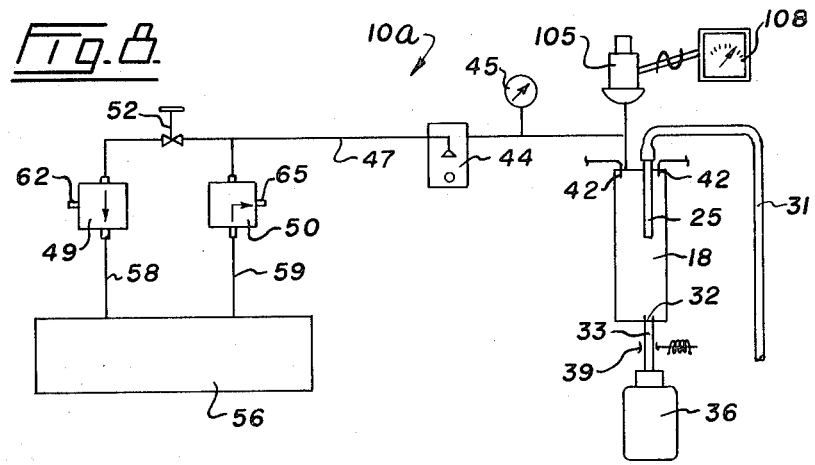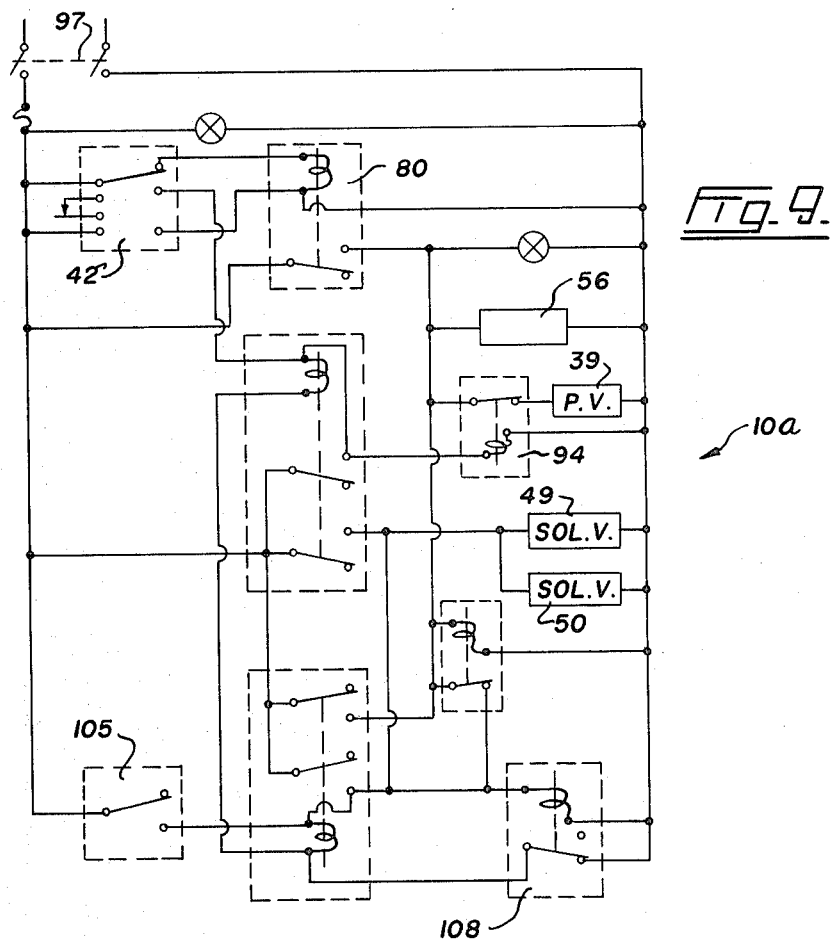

POWER PURGED LIQUID SAMPLER

This invention relates to apparatus for taking measured samples of liquids with or without solids therein.

Although this sampling apparatus can be used with clear liquids, it is primarily intended for liquids including solids which are liable to cause blockages in the tubes and passages of the apparatus. For example, the apparatus can be used for taking samples of liquids in commercial operations in order to keep track of the consistency of the liquids for analysis, or in chemical or sewage plants.

There are many different types of sampling apparatus in existence today. However, some of the prior samplers cannot be used with liquids having solids therein, while others of the samplers do take samples from such liquids, but are subjected to blockages, and therefore the sample volumes are not consistent.

The sampler in accordance with this invention practically eliminates these problems. It includes a system for blowing out the sample lines so that if they do become blocked by the solids in the liquid, they are cleared by the blowing operation. In addition, this sampler includes means for taking exactly a desired quantity of each sample each time the apparatus is in operation. This is done even when temporary blockages occur during the taking of any sample. As a result, the sampling apparatus can operate for long periods without any special attention even though the type or amount of the solids in the liquid causes numerous or even constantly-occuring blockages.

Apparatus for taking measured samples in accordance with the present invention comprises a closed metering chamber, a volume control tube extending into the chamber and having a lower end above the bottom thereof, the liquid being sampled entering the chamber through this tube, a source of positive and negative pressure operatively connected to the chamber near the top thereof, a means causing said source alternatively to apply vacuum and pressure to the chamber for predetermined periods, and a level controller in the chamber above the lower end of the control tube and connected to said source to operate the latter to shut off the vacuum and start the pressure when liquid in the chamber reaches a predetermined level, said pressure forcing the liquid out through the control tube until the level of the liquid reaches the lower end of said tube. The container now holds a predetermined volume of the liquid, and this volume is determined by the position of the lower end of the control tube above the bottom of the chamber. It is preferable that this tube can be adjusted vertically in order that the apparatus may be set to take different quantities of liquid as samples. Although the sample liquid can be removed manually from the chamber, it is preferable to provide an outlet at the bottom of the chamber controlled by a valve so that the valve can be opened after the liquid level in the chamber reaches the lower end of the control tube. With this arrangement, the measured sample is automatically dumped from the chamber.

Figure 2:
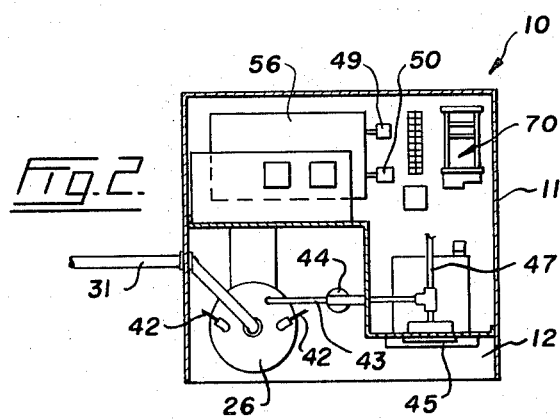
Figure 7:
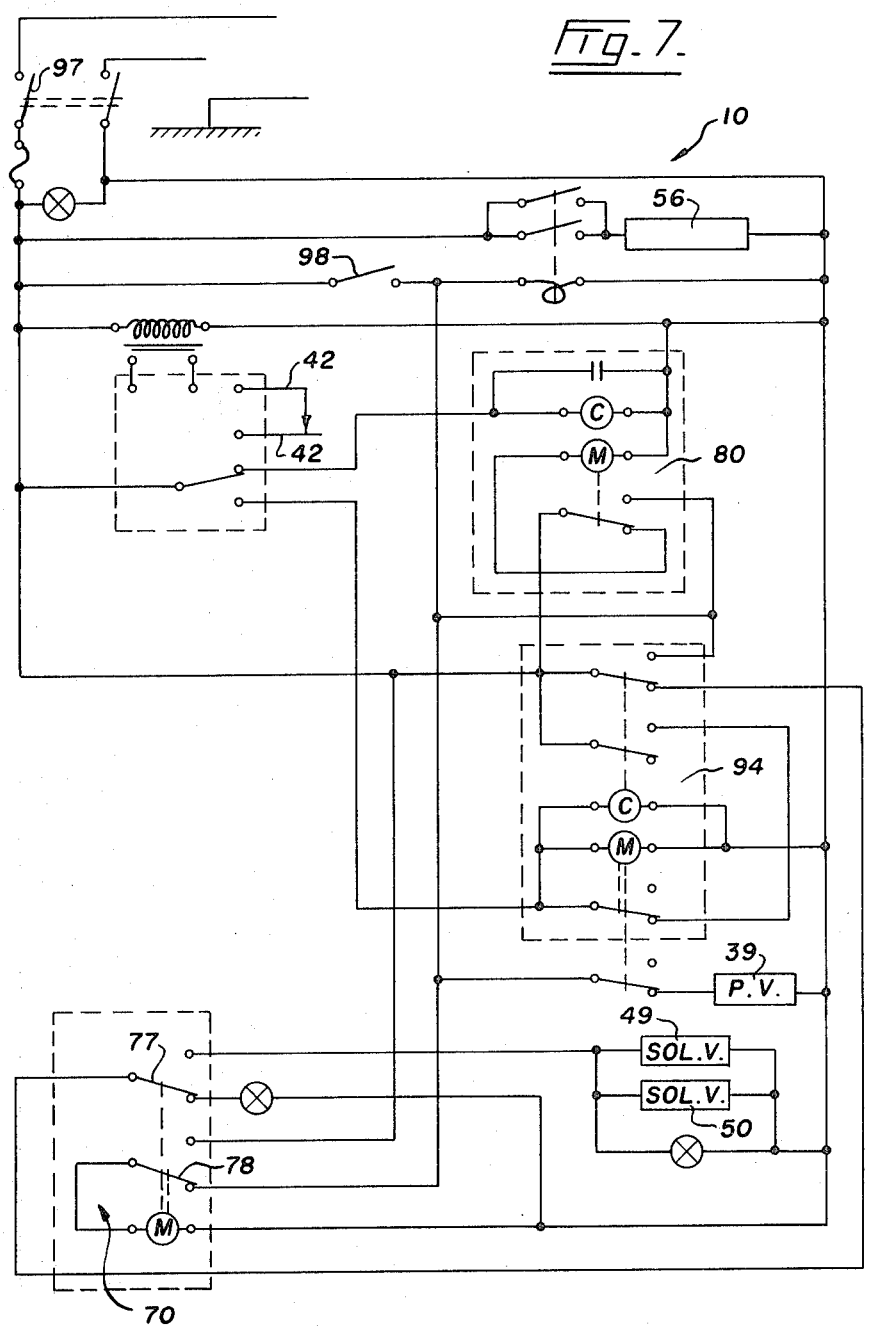

Examples of this invention are illustrated in the accompanying drawings, in which FIG. 1 is a front elevation of sampling apparatus in accordance with this invention, FIG. 2 is a plan view of the apparatus with the top of the cabinet thereof broken away, FIG. 3 is a diagrammatic layout of one form of the apparatus as it is set when suction is being applied to the chamber, FIG. 4 is a fragmentary diagram showing part of the apparatus of FIG. 3 when pressure is being applied to the chamber, FIG. 5 illustrates an example of a program timer used in the apparatus of FIG. 3, FIG. 6 is an enlarged perspective view of two cams of this program timer, FIG. 7 is a diagram of the wiring of said apparatus, FIG. 8 is a diagrammatic layout similar to FIG. 3, illustrating an alternative form of the apparatus, and FIG. 9 is a diagram of the wiring for the apparatus of FIG. 8.

Referring to the drawings, 10 is a sampler apparatus in accordance with this invention. This apparatus includes a cabinet 11 having an upper section 12 and a lower section 13.

A closed metering chamber 18 is mounted in the upper section of cabinet 11. Although this chamber may be of any desired shape, it is preferably of tubular shape, as shown, and has a cylindrical wall 20 which is preferably formed of transparent material, this wall having graduation marks 21 thereon. These marks indicate different volumes within the chamber, and for example, the volume between any two of these marks may be 100 cc.

A volume control tube 25 extends through a cover 26 of the chamber and down into said chamber, and this tube is preferably adjustable vertically so that the lower end 28 thereof can be set at different positions relative to the chamber bottom 29. A tube or hose 31 is connected to the outer end of tube 25 and extends out of the cabinet, this hose being long enough to extend into the liquid from which samples are to be taken.

Although for some purposes chamber 18 may not need an outlet at the bottom it is preferable to provide an outlet opening 32 in the bottom 29 thereof. An outlet tube 33 extends from outlet 32 down into a container or jar 36 positioned in the lower section 13 of the cabinet. A shut-off valve is provided for controlling the outlet from the chamber, and in this example, the valve is in the form of a pinch valve 39 which can be operated to squeeze and close off tube 33 when desired. Valve 39 is operated in any suitable manner to open and close off outlet tube 33, such as by a solenoid 40, as shown in FIG. 3.

A level controller is provided in chamber 18 above lower end 28 of control tube 25. In this example, the level controller is in the form of a pair of electrodes 42 that project downwardly from chamber top 26 into the chamber.

A vacuum/pressure tube 43 extends from within chamber 18 near the top thereof through top 26 and to a water trap 44. If desired, a gauge 45 may be connected to tube 43. Another tube 47 extends from trap 44 to a solenoid vacuum valve 49 and a solenoid pressure valve 50. A suitable control, such as a needle valve 52 is positioned in the portion of pipe 47 extending to valve 49. A suitable vacuum pump 56 is provided, this pump being driven by an electric motor, not shown. The suction side of pump 56 is connected by pipe 58 to valve 49, while the pressure or outlet side of said pump is connected to valve 50 by a pipe 59. Valve 49 has an inlet 62 which can be selectively brought into communication with pipe 58 by the valve, at which time tube 47 is closed off by said valve. Similarly, valve 50 is provided with an outlet 65 which can be selectively brought into communication with pipe 59, at which time pipe 47 is closed off by the valve. Pump 56 and valves 49 and 50 constitute a source of positive and negative pressure.

The apparatus described so far is common to both of the illustrated forms of the invention, one form being illustrated in FIGS. 1 to 7, and the other form in FIG. 8.

In the form of FIGS. 1 to 7, a program timer 70 is provided in cabinet 10 for operating valves 49 and 50 selectively to apply pressure or vacuum to chamber 18. In this example, timer 70 includes an electric motor 71 which drives a shaft 72 upon which adjustable cams 73 and 74 are fixedly mounted. Cam 73 is positioned to operate a microswitch 77, while cam 74 operates a microswitch 78.

The apparatus can be provided with a cycle timer 80. This timer is used to cause apparatus 10 to take samples at predetermined intervals. When timer 80 times out, apparatus 10 is put into operation in order to take a sample, and it will continue to work at taking a sample until the liquid in the metering chamber reaches the electrodes 42, and these cause the timer to be reset.

Cam 73 has two different sections 81 and 82 while cam 74 has a relatively large section 84 and a notch 85 therein, see FIG. 6. The actuator of switch 78 is normally in notch 85 of cam 74. When motor 71 is started by timer 80, cam section 84 moves the switch actuator out of the cam notch, and this switch keeps motor 71 running until said switch actuator drops back into notch 85. However, motor 71 will keep running at this time unless the liquid in the metering chamber has reached electrodes 42, causing timer 80 to be reset.

At the time program motor 71 starts, valves 49 and 50 are in the positions shown in FIG. 4, at which time pump 56 is supplying pressurized air to chamber 18, said air being drawn in through inlet 62 of valve 49. When section 82 of cam 73 operates switch 77, the positions of valves 49 and 50 are reversed, as shown in FIG. 3, at which time pump 56 draws air out of chamber 18 and expels this air through the outlet 65 of valve 50. The time of each suction phase and of each pressure phase depends upon the speed of rotation of shaft 72 and the relative sizes of sections 81 and 82 of cam 73.

Apparatus 10 is provided with a purge timer 94 which, when it is brought into operation, sets valves 49 and 50 so that pump 56 directs air into metering chamber 18. After a predetermined time, for example, 5 seconds, this timer opens pinch valve 39, and after another predetermined time, for example 5 seconds, this timer shuts off the apparatus and resets itself.

A switch 97 is provided by means of which apparatus 10 is connected to or disconnected from the electric power mains. Another switch 98 can be provided by means of which apparatus 10 can be manually put into operation.

The operation of apparatus 10 is generally as follows. When it is desired to take a sample of the liquid, with valve 39 closed, pressure is applied to chamber 18 for a predetermined time, for example 60 seconds, in order to blow out the chamber, tube 25 and hose 31. This dislodges any of the liquid that may have remained in hose 31 from the last operation and unblocks the latter. Then suction is applied to the chamber to draw liquid thereinto through hose 31 and control tube 25. This suction continues for a predetermined time, for example 60 seconds, unless the liquid first reaches electrodes 42 in the chamber. If this takes place, the suction is immediately cut off, and pressure is applied to the chamber. This pressure is continued for, say five seconds, during which time liquid is blown back out through tube 25 until the level of the liquid in the metering chamber reaches the lower end of said tube. The liquid stays at this level while the air blows out under pressure through the tube. At the end of the five second period, pinch valve 39 is opened to allow the air to blow the liquid out of the chamber through tube 33 into jar 36. The blowing continues for say five seconds and then the apparatus is shut off.

If for any reason the level of the liquid in chamber 18 does not reach electrodes 42 during the suction mentioned above, the chamber is subjected to another pressure cycle followed by a suction cycle. The alternate pressure and suction cycles will continue until the liquid reaches the electrodes. In other words, if hose 31 becomes blocked by solids in the liquid so that the liquid does not reach the electrodes during the suction cycle, pressure is applied to blow out the tube. The alternate pressure and suction cycles will continue until the tube is cleared. With this arrangement, it does not matter whether only some liquid is drawn into the chamber during each suction cycle since the alternating cycles will continue until the liquid reaches the electrodes. Any liquid drawn into the chamber remains therein until the electrodes are reached. Once this level is reached, pressure is applied to the chamber, and this blows liquid out of it until only the desired amount of the liquid remains in the chamber, this amount being determined by the level of the lower end of control tube 25. Thus, the apparatus will discharge a sample only when there is an exact predetermined amount of the liquid in the metering chamber. Blockages or partial blockages do not result in the taking of incomplete samples. The apparatus continues to suck and blow until the metering chamber is substantially full.

The following is a desirable operating sequence for apparatus 10. A sample-taking operation is started by a signal either from cycle timer 80 or by the closing of switch 98. It should also be kept in mind that the starting signal can be initiated by an external signal, for instance from a flow meter. Assuming that the operation is started by timer 80, this timer starts motor 71 of program timer 70, and at the same time, pressure is applied to chamber 25 and continues for a predetermined time, section 81 of cam 73 keeping switch 77 in the proper position at this time. Then after a predetermined period, cam section 82 operates switch 77 to reverse valves 49 and 50 so that suction is applied to the metering chamber to draw liquid into it. If the suction cycle ends before the liquid reaches electrodes 42, pressure is again applied to the chamber to blow out the lines thereto. When the liquid reaches the electrodes, cycle timer 80 is reset and purge timer 94 comes into operation and over-rides the program timer, and this immediately reverses valves 49 and 50 to apply pressure to the chamber. Program timer 70 continues to run until the actuator of switch 78 reaches notch 85 of cam 74. After a predetermined period, the purge timer opens valve 39 to allow the pressure to blow the liquid out of the chamber into the receiving jar 36. At the end of a predetermined pressure period, the purge timer shuts off the apparatus and resets itself.

In FIGS. 8 and 9, apparatus 10a is an alternative form of the invention, in which program timer 70 is replaced by a vacuum switch 105 and a blow timer 108. Vacuum switch 105 is in communication with metering chamber 18 so as to be affected by vacuum within the chamber. This switch is set so as to be operated by a predetermined degree of vacuum in the chamber, this being above the vacuum required to draw liquid into the chamber. Blow timer 108 is connected to solenoid valves 49 and 50 and to vacuum switch 105 so that when the latter is actuated, the blow timer is started and the solenoid valves are changed to apply pressure to the metering chamber. After a preset time, timer 108 reverses the valves 49 and 50 so as again to apply suction to the chamber.

The following is a desirable operating sequence for apparatus 10a. A sample-taking operation is started, by a signal, for example, from cycle timer 80. This starts blow timer 108 and pump 56 to apply pressure to chamber 18 for the preset time to purge the system by blowing out the chamber, control tube 25 and hose 31, pinch valve 39 being closed at this time. At the end of the preset time, valves 49 and 50 are reversed to apply suction to the metering chamber and thereby draw liquid thereinto. When the liquid reaches electrodes 42, purge timer 94 comes into operation and changes valves 49 and 50 to apply pressure to the chamber. After a predetermined time, the purge timer opens valve 39 to allow the pressure to blow the liquid out of the chamber into receiving jar 36. At the end of a predetermined pressure period, the blow timer 108 shuts off the apparatus and resets the cycle timer 80.

On the other hand, if a blockage occurs during the suction period, the vacuum in chamber 18 increases sharply and when it reaches the point where vacuum switch 105 is actuated, timer 108 is started to apply pressure to the chamber and blow out the system and any clogging material therein. At the end of the preset time of timer 108, suction is again applied to the chamber. Alternating periods of suction and pressure will be applied to the metering chamber until the liquid therein reaches electrodes 42.

As stated above, the automatic expulsion of the liquid from the metering chamber of the sampler may be omitted. In this case, the measured sample would be taken in the manner described above, and the purge timer would cause pressure to be applied to the metering chamber for a predetermined time, which would be sufficient to cause the level of the liquid to move to the lower end of control tube 25, after which the purge timer would shut off the apparatus. In this case, chamber 18 would have to be removed in order to get the measured sample out of it.

I claim:

1. Apparatus for taking measured samples of liquids with or without solids therein, comprising a closed metering chamber, a volume control tube extending into the chamber and having a lower end above the bottom thereof, the liquid being sampled entering the chamber through the control tube, a source of positive and negative pressure operatively connected to the chamber near the top thereof, control means for causing said source selectively to apply pressure and suction to the chamber, said pressure blowing out the control tube and said suction drawing liquid into the chamber, and a level controller in the chamber above the lower end of the control tube and connected to said source to operate the latter to shut off the suction and start the pressure when liquid in the chamber reaches a predetermined level, said pressure forcing liquid out through the control tube until the level of the liquid reaches the lower end of said tube.

2. Apparatus as claimed in claim 1 including an outlet at the bottom of the chamber, a shut-off valve controlling said outlet, and means for opening said valve after the liquid level reaches the lower end of the tube.

3. Apparatus as claimed in claim 2 in which said control means includes means causing the pressure and suction to be applied to the metering chamber alternatively for predetermined periods.

4. Apparatus as claimed in claim 2 in which said control means includes means for applying the pressure to the metering chamber for predetermined periods, and means for cutting off the suction when the vacuum created thereby in the chamber reaches a predetermined level.

5. Apparatus as claimed in claim 1 in which said control means includes means causing the pressure and suction to be applied to the metering chamber alternatively for predetermined periods.

6. Apparatus as claimed in claim 1 in which said control means includes means for applying the pressure to the metering chamber for predetermined periods, and means for cutting off the suction when the vacuum created thereby in the chamber reaches a predetermined level.

7. Apparatus as claimed in claim 1 in which said control tube is adjustable vertically relative to the metering chamber.

8. Apparatus as claimed in claim 7 in which said level controller is connected to said control means to stop the latter when the liquid reaches said predetermined level.

9. Apparatus as claimed in claim 7 including an outlet at the bottom of the chamber, a closed shut-off valve controlling said outlet, means for applying pressure to the chamber after the liquid has reached the predetermined level, and means for opening said valve a predetermined time after the liquid has reached the predetermined level.

10. Apparatus as claimed in claim 1, in which said level controller is connected to said control means to stop the latter when the liquid reaches said predetermined level.

11. Apparatus as claimed in claim 1 including an outlet at the bottom of the chamber, a closed shut-off valve controlling said outlet, means for applying pressure to the chamber after the liquid has reached the predetermined level, and means for opening said valve a predetermined time after the liquid has reached the predetermined level.

12. Apparatus for taking measured samples of liquid with or without solids therein, comprising a closed metering chamber, a volume control tube extending into the chamber and having a lower end above the bottom thereof, the liquid being sampled entering the chamber through the control tube, a source of positive and negative pressure operatively connected to the chamber near the top thereof, a program timer to cause said power source alternatively to apply pressure and suction to the chamber during predetermined periods, a level controller in the chamber above the lower end of the control tube, and a purge timer set into operation by the level controller when the liquid in the chamber reaches a predetermined level above the lower end of the control tube, said purge timer being connected to over-ride the program timer and to cause said power source to cut off the suction and to apply pressure to the chamber to expel liquid therefrom through the control tube until the liquid level reaches the lower end of said tube.

13. Apparatus as claimed in claim 12 including an outlet at the bottom of the chamber, a shut off valve controlling said outlet, said purge timer being connected to open the shut-off valve a predetermined time after having started the expulsion of the liquid through the control tube to cause liquid to be forced out through said outlet.

14. Apparatus as claimed in claim 13 in which said purge timer includes means to close the shut-off valve before it causes suction to be applied to the metering chamber.

15. Apparatus as claimed in claim 12 in which said control tube is adjustable vertically relative to the metering chamber.

16. Apparatus for taking measured samples of liquids with or without solids therein, comprising a closed metering chamber, a volume control tube extending into the chamber and having a lower end above the bottom thereof, the liquid being sampled entering the chamber through the control tube, a source of positive and negative pressure operatively connected to the chamber near the top thereof, a blower timer to cause said power source to apply pressure to the chamber during predetermined periods, a vacuum-operated control in communication with the chamber connected to stop the power source from applying suction to the chamber and to start said blower timer when the vacuum created in the chamber reaches a predetermined level, a level controller in the chamber above the lower end of the control tube and connected to said source to operate the latter to shut off the suction and start the pressure when liquid in the chamber reaches a predetermined level, said pressure forcing liquid out through the control tube until the level of the liquid reaches the lower end of said tube.

17. Apparatus as claimed in claim 16 including a purge timer started by said level controller when the liquid reaches said predetermined level, said purge timer being connected to cause said power source to cut off the suction and to apply pressure to the chamber to expel liquid therefrom through the control tube until the liquid level reaches the lower end of said tube.

18. Apparatus for taking measured samples of liquids with or without solids therein, comprising a closed metering chamber, an inlet tube opening into the chamber spaced above the bottom thereof, the liquid being sampled entering the chamber through the inlet tube, a source of positive and negative pressure operatively connected to the chamber near the top thereof, control means for causing said source selectively to apply pressure and suction to the chamber, said pressure blowing out the inlet tube and said suction drawing liquid through said inlet tube into the chamber, a level controller in the chamber and connected to said force to operate the latter to shut off the suction and start the pressure when the liquid in the chamber reaches a predetermined level, an outlet at the bottom of the chamber, and means for closing and opening said outlet, said pressure forcing liquid out of the chamber when applied thereto while the outlet is open.

19. Apparatus as claimed in claim 18 including means for operating said closing and opening means to open said outlet when the pressure is applied to the liquid after the suction is shut off.

* * * * *

UNITED STATES PATENT OFFICE
CERTIFICATE OF CORRECTION

Patent No. 3,795,347          Dated March 5, 1974

Inventor(s) Ernst Singer

It is certified that error appears in the above-identified patent and that said Letters Patent are hereby corrected as shown below:

On the cover sheet [76] "P. O. Box 3491 Luget" should read -- 3491 Puget --.

Signed and sealed this 5th day of November 1974.

(SEAL)
Attest:

McCOY M. GIBSON JR.
Attesting Officer

C. MARSHALL DANN
Commissioner of Patents

Disclaimer 3,795,347.—*Ernst Singer*, Vancouver, British Columbia, Canada. POWER PURGED LIQUID SAMPLER. Patent dated Mar. 5, 1974. Disclaimer filed Dec. 8, 1975, by the assignee, *Sirco Products, Ltd.*
Hereby enters this disclaimer to claims 1 and 10 of said patent.
[*Official Gazette February 10, 1976.*]